United States Patent [19]

McGhie et al.

[11] Patent Number: 4,460,194

[45] Date of Patent: Jul. 17, 1984

[54] TOWED VEHICLE WITH MEANS FOR CONNECTION TO FIFTH WHEEL OF A TOWING VEHICLE

[75] Inventors: James R. McGhie, Brampton; Semyon I. Fishgal, Toronto, both of Canada

[73] Assignee: American Hoist of Canada Limited, Brampton, Canada

[21] Appl. No.: 378,610

[22] Filed: May 17, 1982

[51] Int. Cl.³ ............................................. B62D 7/14
[52] U.S. Cl. .................................. 280/443; 280/483
[58] Field of Search ................. 280/404, 419, 423 A, 280/423 B, 425 A, 426, 442, 443, 483, 81 B

[56] References Cited

U.S. PATENT DOCUMENTS

| | | | |
|---|---|---|---|
| 1,635,803 | 7/1927 | Sperry | 280/83 |
| 2,819,911 | 1/1958 | Ranta | 280/426 |
| 2,925,285 | 2/1960 | Haas | 280/426 |
| 2,959,428 | 11/1960 | Felburn | 280/426 |
| 2,968,495 | 1/1961 | Hutchens | 280/426 |
| 3,014,739 | 12/1961 | Kress | 280/483 |
| 3,195,922 | 7/1965 | Humes | 280/426 |
| 3,239,238 | 3/1966 | Raden | 280/425 A |
| 3,322,439 | 5/1967 | Le Mmon | 280/426 |
| 3,419,169 | 12/1968 | James | 414/481 |
| 3,448,999 | 6/1969 | Kollander et al. | 280/426 |
| 3,533,644 | 10/1970 | Humes | 280/426 |
| 3,600,304 | 8/1971 | Hildebrandt et al. | 280/426 |
| 3,689,107 | 9/1972 | Humes | 280/426 |
| 3,690,698 | 9/1972 | Humes | 280/426 |
| 3,698,582 | 10/1972 | Weinmann | 414/481 |
| 3,712,641 | 1/1973 | Sherman | 280/426 |
| 3,734,538 | 5/1973 | Humes | 280/426 |
| 3,866,947 | 2/1975 | Yakubow | 280/425 A |
| 3,894,645 | 6/1975 | Verschage | 414/481 |
| 3,903,979 | 9/1975 | Perrotin | 180/140 |
| 3,930,669 | 1/1976 | Kollander et al. | 280/426 |
| 4,010,816 | 3/1977 | Powell | 180/144 |
| 4,244,596 | 1/1981 | Chung | 280/426 |

FOREIGN PATENT DOCUMENTS 1418524 12/1965 France .............................. 280/483

*Primary Examiner*—David M. Mitchell
*Assistant Examiner*—D. Lynn Fugate
*Attorney, Agent, or Firm*—Stanley E. Johnson; Richard J. Hicks

[57] ABSTRACT

A towed vehicle includes a frame, front and rear ground-engaged wheel assemblies mounted along said frame in such a manner that the center of gravity of said vehicle is situated between said front and rear wheel assemblies, and a gooseneck secured to said frame and projecting therefrom. A fluid pressure suspension cylinder is secured to the gooseneck adjacent the free outer end thereof and has a plunger reciprocally mounted therein and projecting downwardly therefrom. A plate with a king pin is secured to the plunger for coupling with the saddle of a fifth wheel on a towing vehicle. The plunger in the cylinder acts in conjunction with a compressible medium, to cushion loads between said gooseneck and towing vehicle. The fifth wheel by way of linkages from a collar rotatably mounted on the cylinder, steer steerable wheels on the towed vehicle.

6 Claims, 8 Drawing Figures

TOWED VEHICLE WITH MEANS FOR CONNECTION TO FIFTH WHEEL OF A TOWING VEHICLE

FIELD OF INVENTION

This invention relates to towed vehicles.

DISCUSSION OF THE PRIOR ART

Most known such vehicles are of trailer and semi-trailer types with their frames, respectively, not supported and supported by the towing vehicle. Therefore, semitrailers are provided only with substantially rear wheels and a gooseneck for pivotal connection to the fifth wheel of a forward saddle vehicle, whereas trailers have both the front and rear wheels and a coupling rod for connection to the towing hook of a forward vehicle.

The present invention relates particularly to a vehicle provided with both front and rear wheels (like trailers) and a gooseneck (like semitrailers), instead of the conventional coupling rod. The vehicle frame is partially supported by both the front wheels and the fifth wheel and therefore requires a suspension system for the gooseneck and also steering of at least the front wheels in most cases.

An object of the present invention is to provide a suspension system for the gooseneck of towed vehicles, a towed vehicle incorporating the same and a towed vehicle having steerable wheels and means for steering the same.

In a vehicle of the present invention the free end of the gooseneck is provided with a fluid pressure suspension cylinder having a plunger reciprocally mounted therein and projecting downwardly therefrom with a king pin and plate on the lower end for hook-up to a fifth wheel of a tractor towing vehicle. The fluid pressure cylinder is connected to a source of a compressible medium, such as a hydraulic accumulator.

It should be noted that semitrailer goosenecks provided with cylinders are known (eg. U.S. Pat. Nos. 3,239,238; 3,419,169; 3,698,582; 3,866,947 and 3,894,645). However, such known units are designed either to fold, or raise and lower the gooseneck and do not have above features of a hydraulic suspension.

The cylinder is preferably provided with a radial bushing for the plunger, which if desired, may be provided with oil grooves, channels and the like means supplied with a working hydraulic fluid to form a hydrostatic cushion.

In the present invention the gooseneck suspension unit is also designed for steering steerable wheels on the towed vehicle. For steering, the king pin is fixed to a plate designed so as to be non-rotatable with respect to the fifth wheel of the towing vehicle. The plate is connected by suitable means to a jacket freely rotatable on the outer lateral surface of said cylinder so as to rotate in unison (the plunger being freely rotatable within the cylinder) while at the same time permitting reciprocal movement of the plunger in the cylinder. The collar by linkage means is used to steer steerable wheel assemblies on the towed vehicle.

It should also be mentioned that semitrailers with rear or intermediate wheels steerable by the motive force derived from the fifth wheel are known (eg. U.S. Pat. Nos. 2,819,911; 2,925,285; 2,959,428; 2,968,495; 3,195,922; 3,322,439; 3,448,999; 3,533,644; 3,600,304; 3,689,107; 3,690,698; 3,712,641; 3,734,538; 3,930,669; 4,010,816 and 4,244,596). However, the above semitrailers do not have suspended king pins and front wheels. In this respect this feature of the present invention represents an adaption of the steering to the king pin suspension.

SUMMARY OF THE INVENTION

In keeping with the foregoing there is provided in accordance with the present invention a towed vehicle comprising a frame, front and rear ground engaging wheel assemblies mounted on said frame in such a manner that the center of gravity of said vehicle is situated between said front and rear wheel assemblies, a gooseneck secured to said frame and projecting forwardly therefrom terminating in a free outer end, and a fluid pressure cylinder mounted on said gooseneck adjacent the free outer end thereof and having a plunger reciprocally mounted therein, said plunger projecting downwardly from said gooseneck and having a plate with a king pin secured thereto for coupling with the saddle of a conventional fifth wheel of a tractor towing vehicle, said cylinder and plunger acting in conjunction with a compressible medium to cushion loads between said gooseneck and the towing vehicle.

BRIEF DESCRIPTION OF THE DRAWINGS

The invention is illustrated by way of example in the accompanying drawings wherein.

DESCRIPTION OF THE PREFERRED EMBODIMENT

Figure 1:
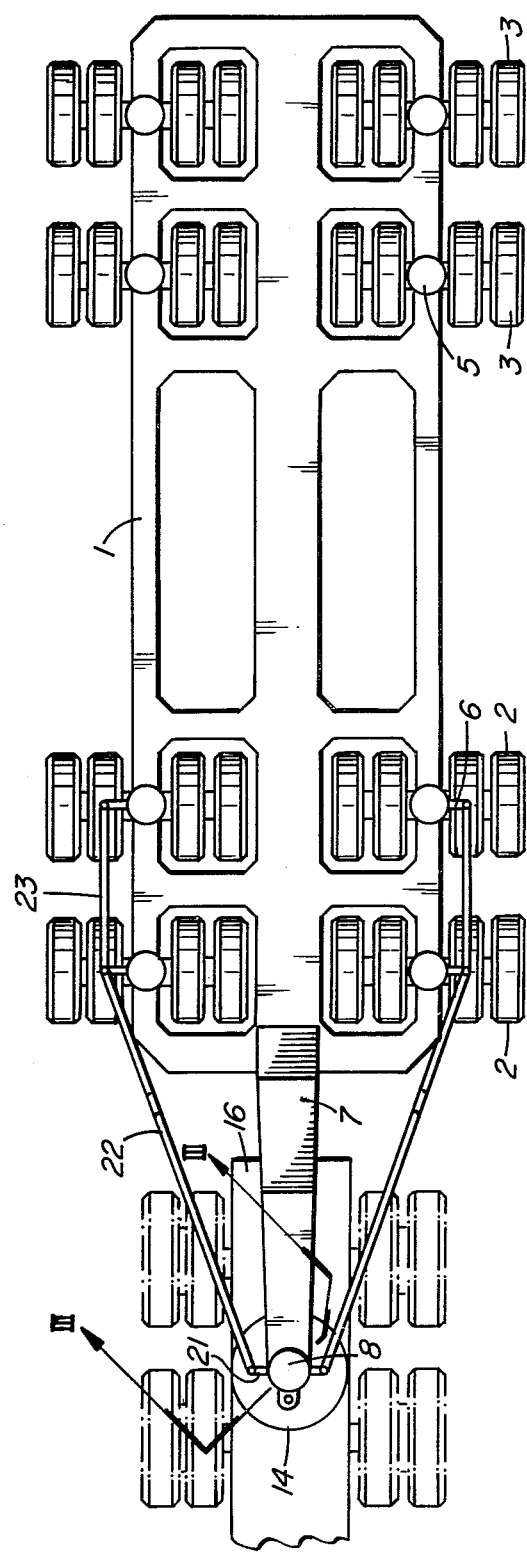
FIG. 1 is a plan view of a towed vehicle provided in accordance with the present invention.
Figure 2:
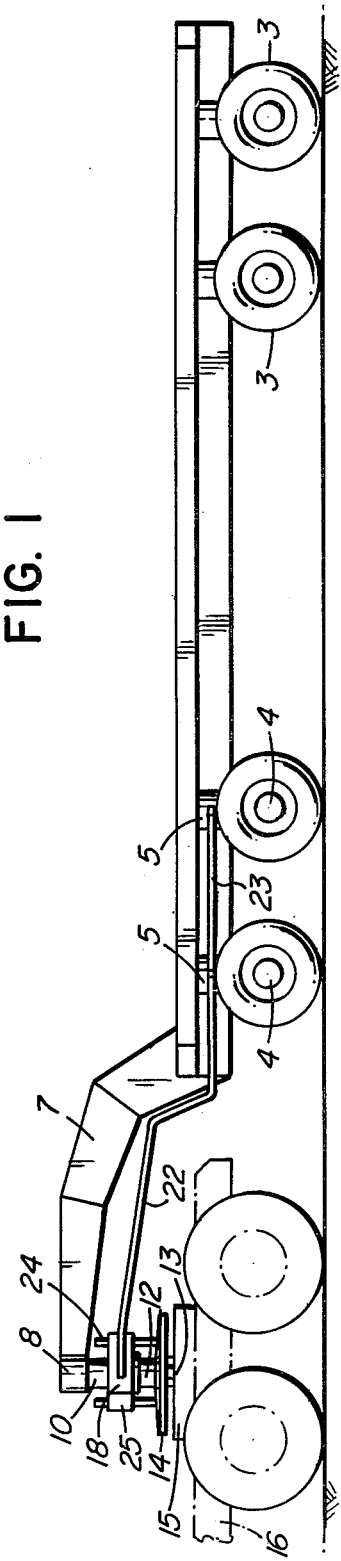
FIG. 2 is a side elevational view of FIG. 1.

The towed vehicle of the present invention (FIG. 1 and 2) includes a frame 1 along which respective front and rear ground engaging wheel assembies 2 and 3 are mounted in such a manner, that the center of gravity of the vehicle is situated between the assemblies 2 and 3. At least the front wheel assemblies 2 are made steerable. This is achieved by mounting wheels on the ends of substantially horizontal axles 4 connected intermediate the ends thereof to upright wheel support assemblies 5. The wheel support assemblies 5 of the front wheel assemblies 2 are rotatable about a vertical axis and provided with arms 6 actuatable by a steering system of the vehicle. In FIGS. 1 and 2 the rear assemblies 3 are examplary shown non-steerable with the wheel support assemblies non rotatably fixed to the frame 1. The steerable wheel support assemblies may be any known type but preferably are constructed in the manner described and illustrated in applicants U.S. application filed May 17, 1982 entitled "Steerable Wheel Suspension Assembly" Ser. No. 378,613, the disclosure of which is incorporated herein by reference thereto. A gooseneck 7 of the vehicle comprises a generally upright rear section rigidly secured to the front of the frame 1 and a forwardly extending generally horizontal beam. A housing 8, in the form of a cap having an open lower end is rigidly secured to the free end of the gooseneck as by welding or any other suitable means. A fluid pressure cylinder 10 projects into the housing and extends downwardly therefrom. The cylinder 10 is fixed to the housing by conventional fasteners as at 11, and/or by welding or any other suitable means. The cylinder 10 has a plunger 12 reciprocally mounted therein and projecting downwardly therefrom on the free end of which a plate 14 is rigidly secured. A king pin 13 is secured to the plate and projects downwardly therefrom. The plate also has a tapered (as would be seen in plan view) block or wedge 14A on the lower surface that projects into the notch of a conventional fifth wheel 15 of a tractor towing vehicle 16. Block 14A prevents plate 14 from rotating relative to the saddle of the fifth wheel when sitting thereon. The cylinder 10 is connected to a fluid pressure source (e.g. a hydraulic accumulator) by means of an outlet 17 (said source is not shown in the drawings). The king pin 13 connects to the fifth wheel 15 in a conventional manner.

On the outer lateral surface of the cylinder 10 there is rotatably mounted a collar 18 which is retained in position by a flange 19 and conventional C clip 20. The collar 18 has a pair of arms 21 projecting outwardly therefrom which are connected to the arms 6 of the front wheel assemblies by means of links 22 and 23. The collar 18, cylinder 10 and plunger 12 are arranged concentrically on a common axis with the plunger and collar being rotatable about such axis. The collar 18 is connected by suitable coupling means with the plunger 12 causing the same to rotate in unison about said common axis while at the same time allowing reciprocal movement of the plunger in the cylinder. The coupling means illustrated in FIGS. 1–3 consists of at least one upright rod 24 fixed to the plate 14 and sliding within a sleeve 25 rigidly secured to the collar 18. The rod 24 serves both as the coupling and as a longitudinal slideway to accept side loads.

Figure 3:
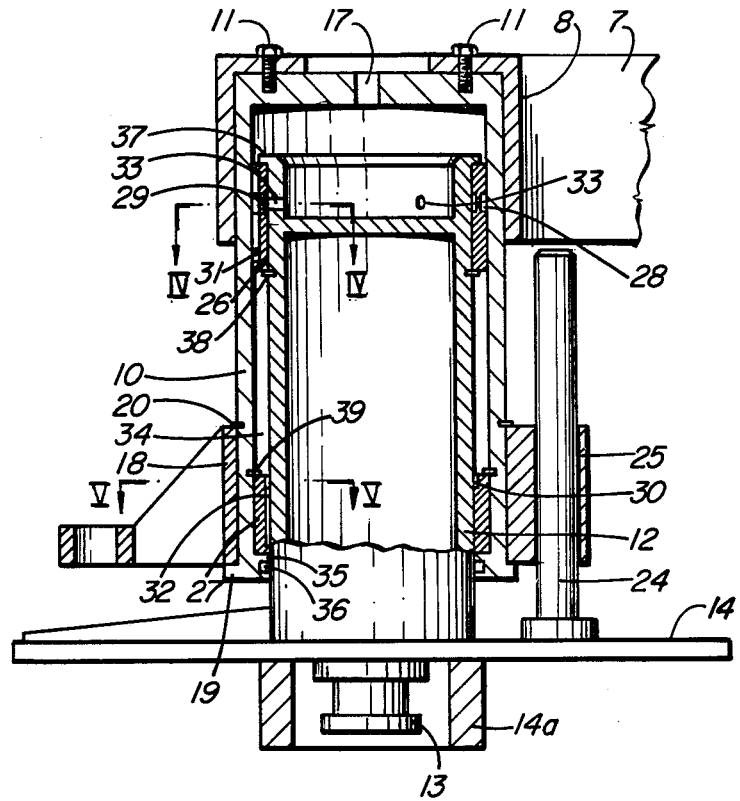
FIG. 3 is a sectional view taken along line III—III of FIG. 1, a longitudinal slideway and a steering arm being conditionally shown in the same plane.
Figures 4, 5:
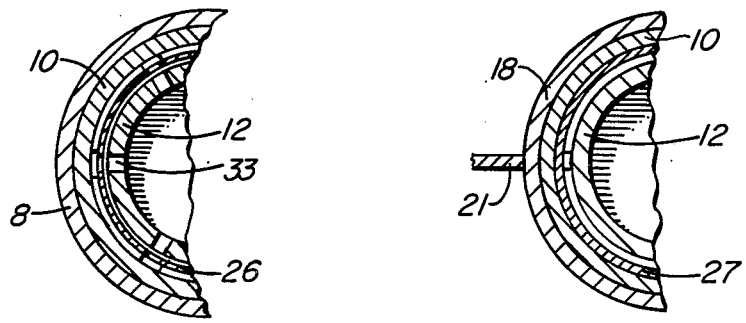
FIG. 4 is a section view taken along line IV—IV of FIG. 3.
FIG. 5 is a sectional view taken along line V—V of FIG. 3.

Also, FIGS. 3–5 by way of illustration, but not in a limiting sense, the cylinder 10 is shown pistonless with radial bushings 26 and 27 provided with oil circular grooves 28, 29, 30 and axial channels 31, 32 supplied with a working hydraulic fluid via openings 33 in the plunger 12 and from a cavity 34. The plunger is sealed in a cylinder cover 35 by means of a conventional seal 36.

The bushings 26 and 27 form hydrostatic cushions to withstand side loads on the plunger 12 and are fixed by means of conventional fasteners 37, 38 and 39 respectively to the plunger and cylinder.

Figure 6:
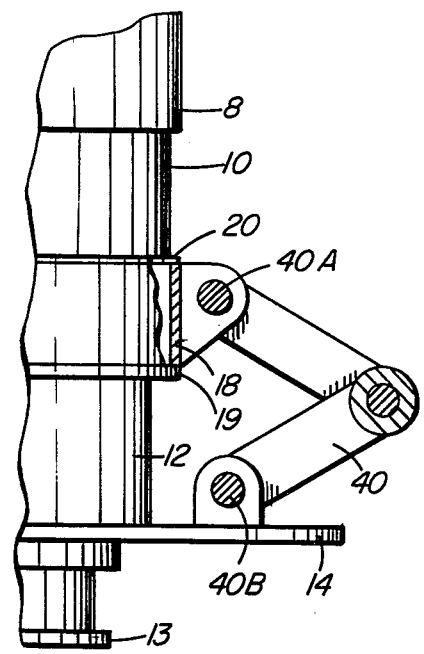
FIGS. 6, 7 and 8 are partial elevational views illustrating modifications for use in the present invention.

In another embodiment (see FIG. 6) the coupling comprises a two-link scissor mechanism 40 pivotally attached at opposite ends by pins 40A and 40B respectively to the collar 18 and plate 14. In this case the provision of the cylinder 10 with radial bushings is compulsory.

Figure 7:
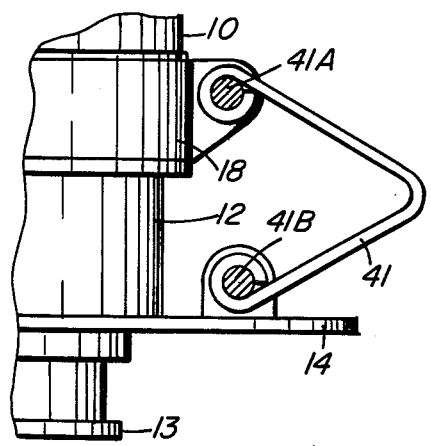
Figure 8:
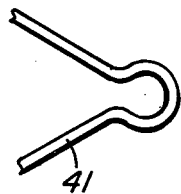

Another coupling means is illustrated in FIG. 7 consisting of a U-shaped leaf spring 41 pivotally connected at opposite ends by pins 41A and 41B respectively to the collar 18 and plate 14. In order to increase the flexibility of the spring, a circular shape in the root of the U can be used (FIG. 8) instead of the arc shape of FIG. 7.

In the driving state the plunger 12 is free to move in response to road shocks and compresses a compressible medium. The compressible medium any be a gas in the cylinder or hydraulic fluid in the cylinder connected to a suitable hydraulic accumulator. This provides a cushion for the load on the fifth wheel. Several levels of suspension stiffness can be obtained by means of precalibrating the accumulator to different given pressures or using several accumulators. This enables the suspension to be used in different conditions, for example, on highways and over land.

In turning, the arms 21 moved by forces derived from the fifth wheel 15, turn the steerable front wheel assemblies by means of the links 22, 23 and the arms 6. The arms 21 accept mainly only the resistance of the wheels to the turn, since the thrust component of the suspension, transferred via the hydrostatic cushion does not create a substantial resistance. Effectively fluid in the cylinder is an end thrust bearing for the plunger and such fluid bearing offers little resistance to rotation of the plunger irrespective of the load.

I claim:

1. A towed vehicle comprising a frame, front and rear ground engaging wheel assemblies each spring mounted on said frame and located in such a manner that the center of gravity of said vehicle is situated between said front and rear wheel assemblies, whereby the wheel assemblies support the entire load carried by the vehicle, a gooseneck secured to said frame and projecting forwardly therefrom terminating in a free outer end, a fluid pressure cylinder mounted on said gooseneck adjacent the free outer end thereof and having a plunger reciprocally mounted therein, said plunger projecting downwardly from said gooseneck and having a plate with a king pin secured thereto for coupling with the saddle of a conventional fifth wheel of a tractor towing vehicle, said cylinder and plunger acting in conjunction with a compressible medium to cushion loads between said gooseneck and the towing vehicle means, preventing relative movement of said plate and the saddle of the fifth wheel on the towing vehicle, a collar rotatably mounted on said cylinder, said plunger being rotatable relative to said cylinder about the axis of rotation of the collar and means interconnecting said collar and plunger causing the same to rotate in unison while at the same time permitting reciprocal movement of the plunger.

2. The vehicle of claim 3 including at least one bushing in said cylinder for guiding said plunger, said bushing being provided with oil grooves and channels supplied with a working hydraulic fluid to form a hydrostatic cushion.

3. The vehicle of claim 1 wherein the front wheels are steerable and including link means connecting said collar and steering arms on said steerable wheels for steering the same by forces derived from said fifth wheel.

4. The vehicle of claim 3 wherein said means connecting the collar and plunger comprises at least one upright rod mounted on said plate and sliding within a sleeve mounted on said collar.

5. The vehicle of claim 3 wherein said connecting means comprises at least one two-link scissor mechanism.

6. The vehicle of claim 3 wherein said connecting means comprises at least one U-shaped leaf spring pivotally connected at opposite ends respectively to said collar and said plate.

* * * * *